(12) United States Patent
Sudhi et al.

(10) Patent No.: US 7,496,605 B2
(45) Date of Patent: Feb. 24, 2009

(54) MANAGING FILES USING METADATA (75) Inventors: Suraj Sudhi, Kayamkulam (IN); Manjit Singh Rajput, Jalna (IN)

(73) Assignee: SAP AG, Walldorf (DE)

( * ) Notice: Subject to any disclaimer, the term of this patent is extended or adjusted under 35 U.S.C. 154(b) by 506 days.

(21) Appl. No.: 11/007,394

(22) Filed: Dec. 8, 2004

(65) Prior Publication Data
US 2006/0123406 A1    Jun. 8, 2006

(51) Int. Cl.
*G06F 17/30* (2006.01)
(52) U.S. Cl. ............... 707/200; 707/3; 707/9; 707/101; 707/204
(58) Field of Classification Search ............ 707/1
See application file for complete search history.

(56) References Cited

U.S. PATENT DOCUMENTS 7,120,687 B1 * 10/2006 Tessman et al. ............ 709/224
7,130,880 B1 * 10/2006 Burton et al. ............ 709/203
2002/0133515 A1 * 9/2002 Kagle et al. ............ 707/511

* cited by examiner

*Primary Examiner*—Cam Y T Truong
(74) *Attorney, Agent, or Firm*—Finnegan, Henderson, Farabow, Garrett & Dunner, LLP (57) ABSTRACT

There are methods and apparatus, including computer program products, for receiving input, from a user, specifying a file to be uploaded to a file repository against a generic attribute, the generic attribute being associated with a location in the file repository and one or more default specific attributes; adding metadata to the specified file, the added metadata comprising the one or more default specific attributes; and storing the specified file with the added metadata at the location in the file repository associated with the generic attribute.

10 Claims, 5 Drawing Sheets

MANAGING FILES USING METADATA

BACKGROUND

This description relates to managing files using metadata.

The knowledge repository of an enterprise (e.g., a business organization) includes files laced in a central server that is accessible by groups of employees. Employees view and add to the files in the knowledge repository on a daily basis.

Current tools for managing files in a knowledge repository do not provide a mechanism by which the files can be managed effectively in response to changing enterprise needs. For example, when an enterprise undergoes an internal reorganization or merges with another enterprise, the task of realigning the files in the knowledge repository with the new enterprise structure is a time consuming process that is performed manually. Typically, a team of employees is tasked with the job of examining the content of each file, manually reclassifying the file, moving the reclassified file to a new location in the repository, and optionally restricting access of the reclassified file to a different group of employees in the new enterprise structure.

SUMMARY

In general, in one aspect, the inventions provides a method including receiving input, from a user, specifying a file to be uploaded to a file repository against a generic attribute, the generic attribute being associated with a location in the file repository and one or more default specific attributes; adding metadata to the specified file, the added metadata comprising the one or more default specific attributes; and storing the specified file with the added metadata at the location in the file repository associated with the generic attribute.

Implementations may include one or more of the following. The generic attribute is associated with a user access list comprising one or more user identifiers. Each user identifier is associated with one or more users authorized to upload a file against the generic attribute. The file repository is associated with an enterprise, and the generic attribute is associated with an enterprise context formed by a logical grouping of knowledge for the enterprise. The file includes text, images, executables, or binary data.

The method includes receiving input, from the user, specifying one or more specific attributes to be associated with the specified file.

The method includes receiving input, from the user, defining a logical expression comprising user-specified specific attributes. The added metadata includes the one or more user-specified specific attributes.

The method includes receiving input, from the user, redefining the generic attribute such that the generic attribute is associated with a new location in the file repository; and moving one or more files that were previously uploaded to the file repository against the generic attribute to the new location in the file repository.

The method includes receiving input, from the user, defining a new generic attribute, the new generic attribute being associated with a location in the file repository and one or more default specific attributes; and performing a search of the file repository to identify files with added metadata including the one or more default specific attributes associated with the new generic attribute; and moving the identified files to the location in the file repository associated with the new generic attribute.

In general, in another aspect, the invention features a computer program product, tangibly embodied in an information carrier, the computer program product being operable to cause a machine to receive input, from a user, specifying a file to be uploaded to a file repository against a generic attribute, the generic attribute being associated with a location in the file repository and one or more default specific attributes; add metadata to the specified file, the added metadata comprising the one or more default specific attributes; and store the specified file with the added metadata at the location in the file repository associated with the generic attribute.

Implementations may include one or more of the following. The generic attribute is associated with a user access list comprising one or more user identifiers. Each user identifier is associated with one or more users authorized to upload a file against the generic attribute. The file repository is associated with an enterprise, and the generic attribute is associated with an enterprise context formed by a logical grouping of knowledge for the enterprise. The file includes text, images, executables, or binary data.

The computer program product is further operable to cause the machine to receive input, from the user, specifying one or more specific attributes to be associated with the specified file.

The computer program product is further operable to cause the machine to receive input, from the user, defining a logical expression comprising user-specified specific attributes. The added metadata includes the one or more user-specified specific attributes.

The computer program product is further operable to cause the machine to receive input, from the user, redefining the generic attribute such that the generic attribute is associated with a new location in the file repository; and move one or more files that were previously uploaded to the file repository against the generic attribute to the new location in the file repository.

The computer program product is further operable to cause the machine to receive input, from the user, defining a new generic attribute, the new generic attribute being associated with a location in the file repository and one or more default specific attributes; and perform a search of the file repository to identify files with added metadata including the one or more default specific attributes associated with the new generic attribute; and move the identified files to the location in the file repository associated with the new generic attribute.

Advantages that can be seen in particular implementations of the invention include one or more of the following. The knowledge resource files are stored in a knowledge repository that operates as a flat file system. There is no need to create sub-directories (or folders) and manually classify files by placing the files in the appropriate sub-directories. Access restrictions to knowledge resource files in the knowledge repository are managed on a workgroup-basis. Accordingly, only members of a workgroup that has been assigned to a generic attribute are permitted to upload files against the generic attribute as well as access files in the repository location associated with the generic attribute. The repository tool enables users to upload files against a generic attribute without knowing the exact pathname of the repository location. In this manner, the pathnames of the repository locations may be changed without having to notify the users. By adding metadata to each knowledge resource file that is uploaded to the knowledge repository, the repository tool ensures that the files can subsequently be reclassified in response to changing enterprise needs, while ensuring that files reside at the correct location and are accessible by the appropriate employees. Using metadata that includes the user-specified specific attributes provided by a user familiar with the content of the file reduces the likelihood that the file is incorrectly reclassified and placed in the wrong repository location by a human operator who is unfamiliar with the content of the file. The knowledge repository can be implemented by a distributed database, which provides, e.g., small companies with a lower-cost alternative to expensive high-end servers.

The details of one or more examples are set forth in the accompanying drawings and the description below. Further features, aspects, and advantages of the invention will become apparent from the description, the drawings, and the claims.

DETAILED DESCRIPTION

The example techniques described in this specification use a repository tool to acquire, manage, and leverage metadata for knowledge resources of an enterprise. The metadata enables knowledge resources to be aligned to, e.g., the structure of the enterprise and realigned to a new or different structure in response to changing needs of the enterprise.

Knowledge resources, in an enterprise sense, reflect the collective learning of the individuals and systems employed by the enterprise. As used in this specification, the term "knowledge resource" reflects that portion of the enterprise know-how that may be reflected, recorded or characterized in a digital electronic format (also referred to as a "knowledge resource file"). A "knowledge repository" is any physical or virtual, centralized or decentralized system suitable for the receipt and storage of knowledge resource files of the enterprise. Each knowledge resource file is an entity of data, i.e., a string of bytes, that is capable of being manipulated as an entity. The knowledge resource files can represent any kind of information, such as text, images, executables, or simply binary data.

In one example scenario, the enterprise is an automotive company that manufactures five vehicle lines including a convertible line. The automotive company has employees that are assigned to different business units, e.g., marketing, information technology, finance, product development, manufacturing, and human resources to name a few. Employees assigned to a particular business unit may work with one or more vehicle lines. For example, a vehicle designer in the product development business unit may work on a single vehicle line at any given time, while advertising professional in the marketing business unit may manage advertising campaigns and budgets for multiple vehicle lines.

Figure 1:
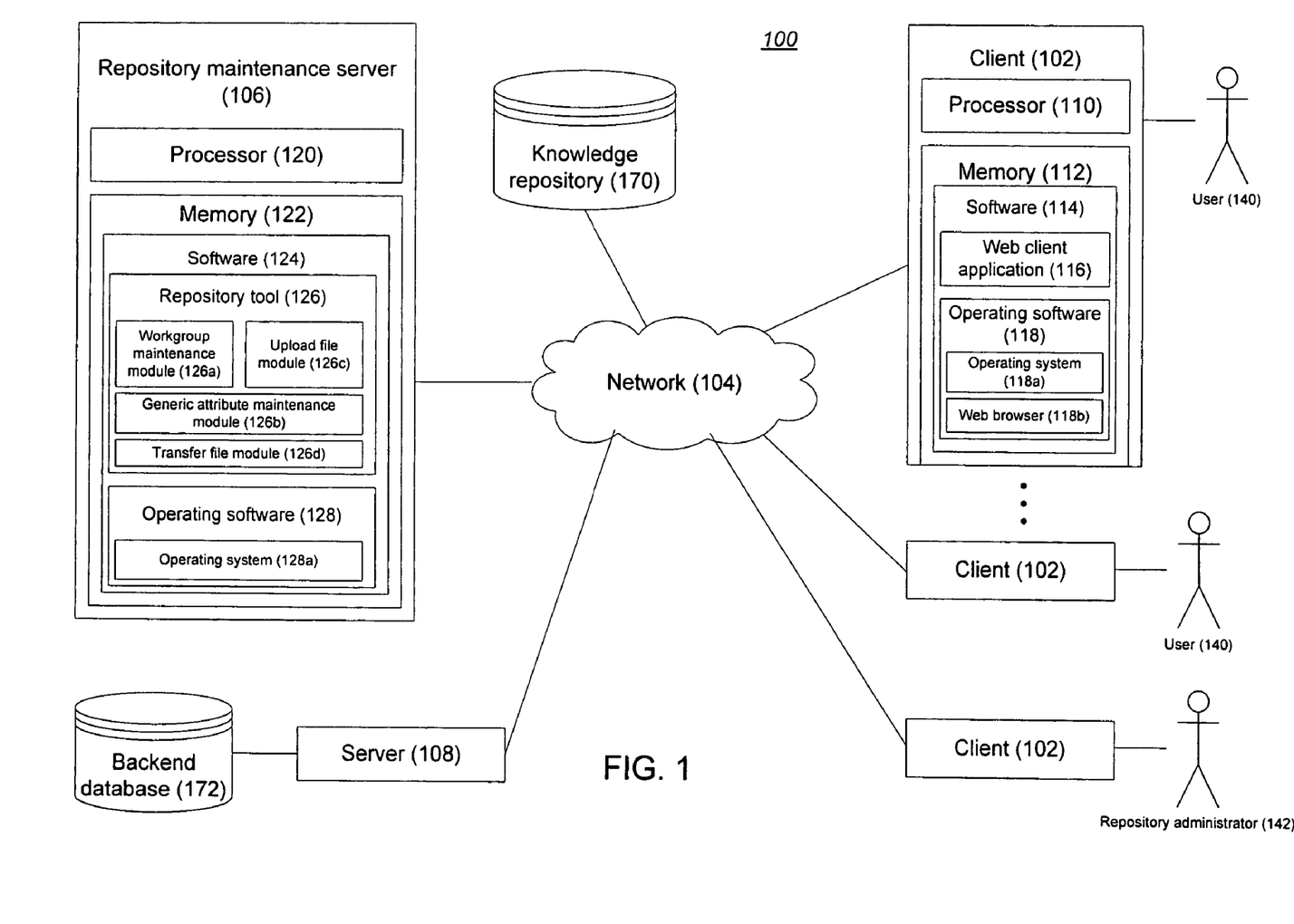
FIG. 1. shows a networked environment for an enterprise.

FIG. 1 shows a networked environment 100 for the automotive company. The networked environment 100 includes a client 102. The client 102 may be any type of Web-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device.

The client 102 may be connected to an internal network, such as a local area network ("LAN"). A router or gateway (not shown) may couple the internal network to an external network, such as the Internet/World Wide Web. Alternatively, the client 102 may be coupled directly to the external network 104 as shown in FIG. 1. The external network 104 runs transmission control protocol/internet protocol ("TCP/IP") or another suitable protocol. Network connections may be via Ethernet, telephone line, wireless, or other transmission media.

The client 102 contains one or more processor(s) 110 (referred to simply as processor 110") and memory 112 for storing software 114. The processor 110 executes software 114, which includes a Web client application 116 and operating software 118. The Web client application 116 includes one or more routines used in implementing the TCP/IP protocol, which allows the client 102 to communicate over the external network 104. The operating software 118 may include an operating system 118a, such as Windows XP®, a Web browser 118b, such as Internet Explore®, and various application programs.

A firewall may be present between the internal network and the external network 104. The firewall may be implemented by software on the client 102 or by software on a gateway, router, or the like (not shown) between the internal network and the external network 104.

The external network 104 may be comprised of one or more networks, such as wide area networks ("WANs"), LANs, wireless networks, and the like, which may or may not be linked by the Internet. The networked environment 100 may include one or more remote computers 106, 108, which are programmed with software for managing the flow of data between the clients 102 and a knowledge repository (represented in FIG. 1 by a single database 170). Although only two remote computers are shown in FIG. 1, any number of remote computers may be provided. The remote computers may be on the same, or different, networks.

The remote computers 106, 108 may be any type of computing devices (e.g., servers), and may have the same or different architectures. For the purposes of the present description, it is assumed that the remote computer 106 is a repository maintenance server that includes one or more processor(s) 120 (referred to simply as processor 120) and memory 122 that stores software 124. The processor 120 executes software 124, which includes a repository tool 126 and operating software 128. The repository tool 126 includes, but is not limited to, a workgroup maintenance module 126a, a generic attribute maintenance module 126b, an upload file module 126c, and a transfer file module 126d. The operating software 128 includes, but is not limited to, an operating system 128a and one or more routines for effecting (e.g., TCP/IP-based) communication over the external network 104.

Figure 2:
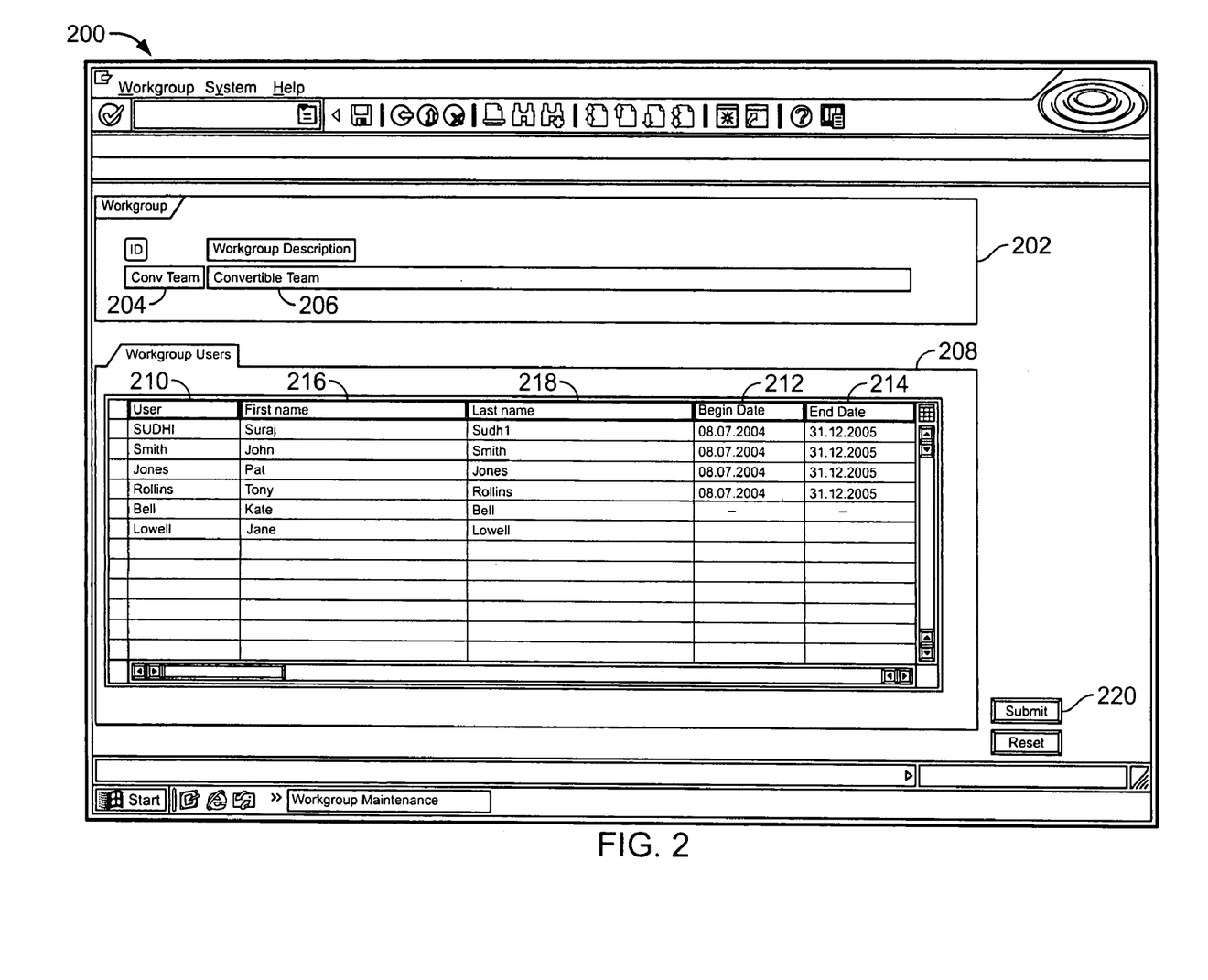
FIGS. 2-5 show user interface windows.

Through a client 102, a repository administrator 142 oversees the integrity of the knowledge repository by interacting with various modules of the repository tool 126. An example interface 200 of the workgroup maintenance module 128a for setting up a new workgroup (i.e., a collection of users) is shown in FIG. 2. The repository administrator 142 enters information in various input fields of a "Workgroup" panel 202 to define the workgroup. Returning to the automotive company example scenario, the repository administrator 142 may set up a workgroup for the group of employees working on the convertible vehicle line. In such a case, the repository administrator 142 enters a workgroup identifier ("ID") of "ConvTeam" 204 and a corresponding workgroup description of "Convertible Team" 206.

To enable the repository administrator 142 to assign users (e.g., vehicle designers and advertising professionals) to the ConvTeam workgroup, the workgroup maintenance module 126a provides a "Workgroup Users" panel 208. The "Workgroup Users" panel 208 includes a table of cells for receiving information from the repository administrator 142 using conventional techniques, e.g., by entering in user IDs in the cells of the table having a column header "User" 210, and specifying the period of time that each user is a member of the ConvTeam workgroup by entering the relevant dates in the cells of the table having column headers "Begin Date" 212 and "End Date" 214. In one implementation, the workgroup maintenance module 126a is connected to a backend database 172 accessible via the remote computer 108 and automatically resolves the user ID to display the associated information in the cells of the table having the column headers "First name" 216 and "Last name" 218. Once the table is filled, the repository administrator 142 clicks on a "Submit" button 220 to create the ConvTeam workgroup.

The repository administrator 142 can set up any number of workgroups using the workgroup maintenance module 126a. In the example scenario, the workgroups can be set up along vehicle lines, business units, or some combination of the two. For enterprises with many employees, one or more administrator workgroups may be set up for the purpose of administering other workgroups and generic attributes. In other words, team(s) of employees may assume of the role of "repository administrator 142".

Figure 3:
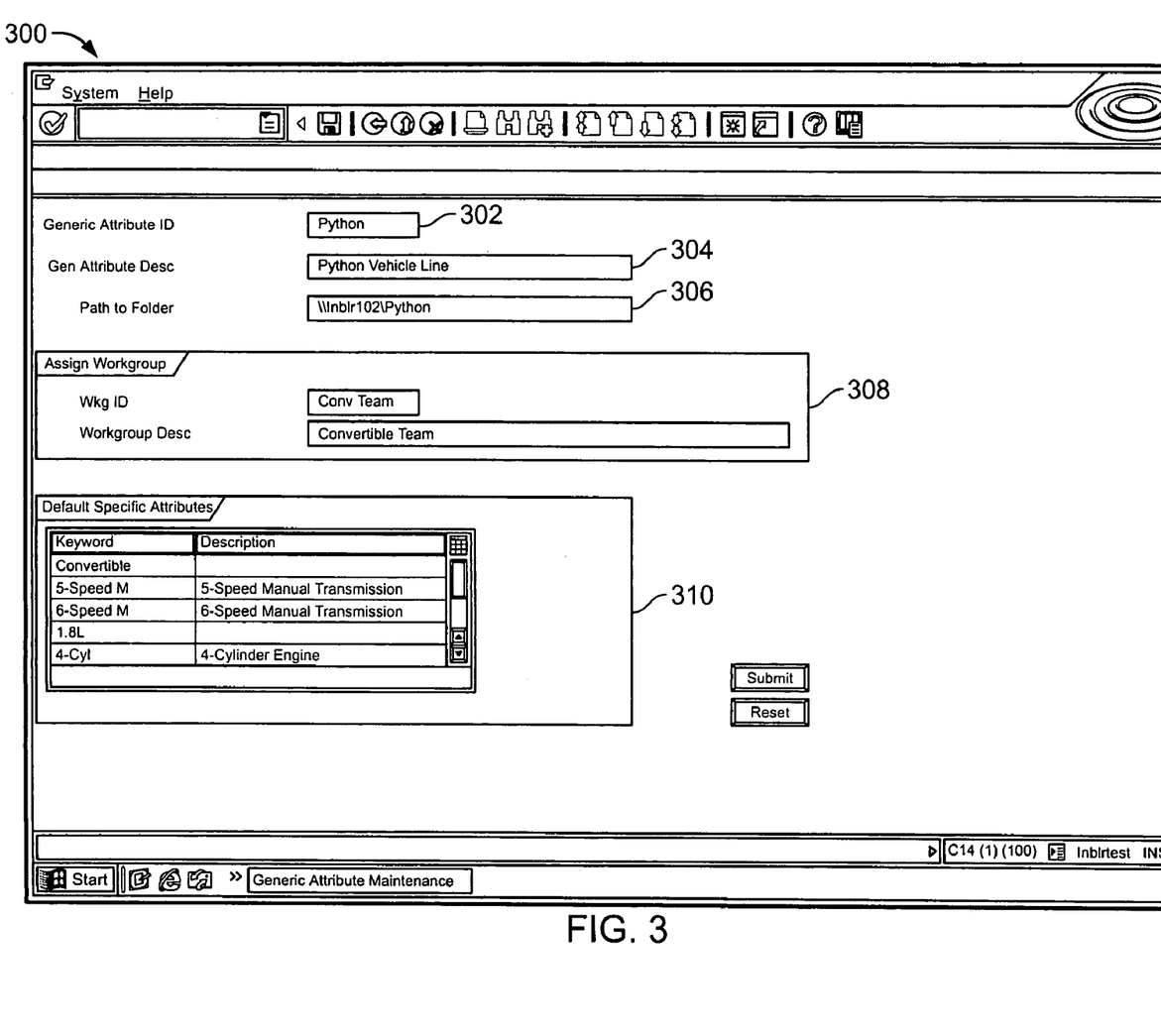

An example interface 300 of the generic attribute maintenance module 126b for defining a new generic attribute is shown in FIG. 3. Each generic attribute defines a link between a workgroup, a repository location, and an enterprise context. In one implementation, a repository location is defined by a pathname specifying a node (file or directory) of the knowledge repository 170 where knowledge resource files uploaded against the generic attribute are placed. The node may reside on a single machine or on multiple machines at one site or distributed across multiple sites and interconnected by the network. The term "enterprise context" as used in this specification refers to any logical grouping of knowledge for the enterprise that is based (at least in part) on common characteristics. In the automotive company scenario, enterprise context may be delineated along, for example, vehicle lines.

Each generic attribute is associated with a unique identifier also referred to as a "generic attribute ID". In the automotive company scenario, suppose, for example, that the internal codename for the convertible vehicle line is "Python". The repository administrator 142 may create a generic attribute having an ID of "Python" 302 and a corresponding generic attribute description of "Python Vehicle Line" 304. The generic attribute ID can be any word or phrase that would be understood by an employee of the enterprise to have a specific connotation with respect to a particular enterprise context. The repository administrator 142 then specifies a repository location (e.g., "\\inblr102\python" 306) for the Python generic attribute and assigns one or more workgroups to the Python generic attribute by entering workgroup IDs in the relevant input field. The example interface 300 includes an "Assign Workgroup" panel 308. Assigning a workgroup to the Python generic attribute enables the users in the assigned workgroup (e.g., the ConvTeam workgroup) to upload knowledge resource files to the repository location 170 specified for the Python generic attribute. This is also referred to as uploading a knowledge resource file against the generic attribute.

The example interface 300 for the generic attribute maintenance module 126b also provides a "Specific Attributes" panel 310 that includes a table of cells for receiving, from the repository administrator 142, keyword and keyword description information used to define specific attributes to be associated with the generic attribute. Such specific attributes (also referred to as "default specific attributes") are automatically included as metadata of any knowledge resource file uploaded against the generic attribute. Each default specific attribute provides information that can be used to identify the content of the knowledge repository files. Returning to the Python generic attribute example, the repository administrator 142 may define default specific attributes including "convertible", "5-speed manual transmission", "6-speed manual transmission", "1.8 L", and "4-cylinder engine" to name a few.

Software applications or packages are loaded on the clients 102 based in part on the respective user's needs as an employee. Each user interacts with the software applications and generates knowledge resource files on a daily basis. The knowledge resource files may be stored locally in a storage device associated with the client 102, or uploaded to the knowledge repository 170 in order to be shared with other employees of the enterprise.

To upload a knowledge resource file to the knowledge repository 170, the user 140 interacts with an interface ("upload file interface") provided by the upload file module 126c of the repository tool 126. In one implementation, the upload file interface includes a log-in screen in which the user 140 provides a valid user ID and password combination. Once the user's identity is verified, the repository tool 126 determines the workgroups that the user is a member of and displays a list of generic attribute IDs in the upload file interface. The list of generic attribute IDs reflects all of the generic attributes that the user's workgroup(s) have previously been assigned to. The user 140 selects, from among the list of generic attribute IDs, a generic attribute ID that is understood by the user (as an employee of the enterprise) as having a connotation that mostly closely satisfies the enterprise context of the knowledge resource file to be uploaded.

Figure 4:
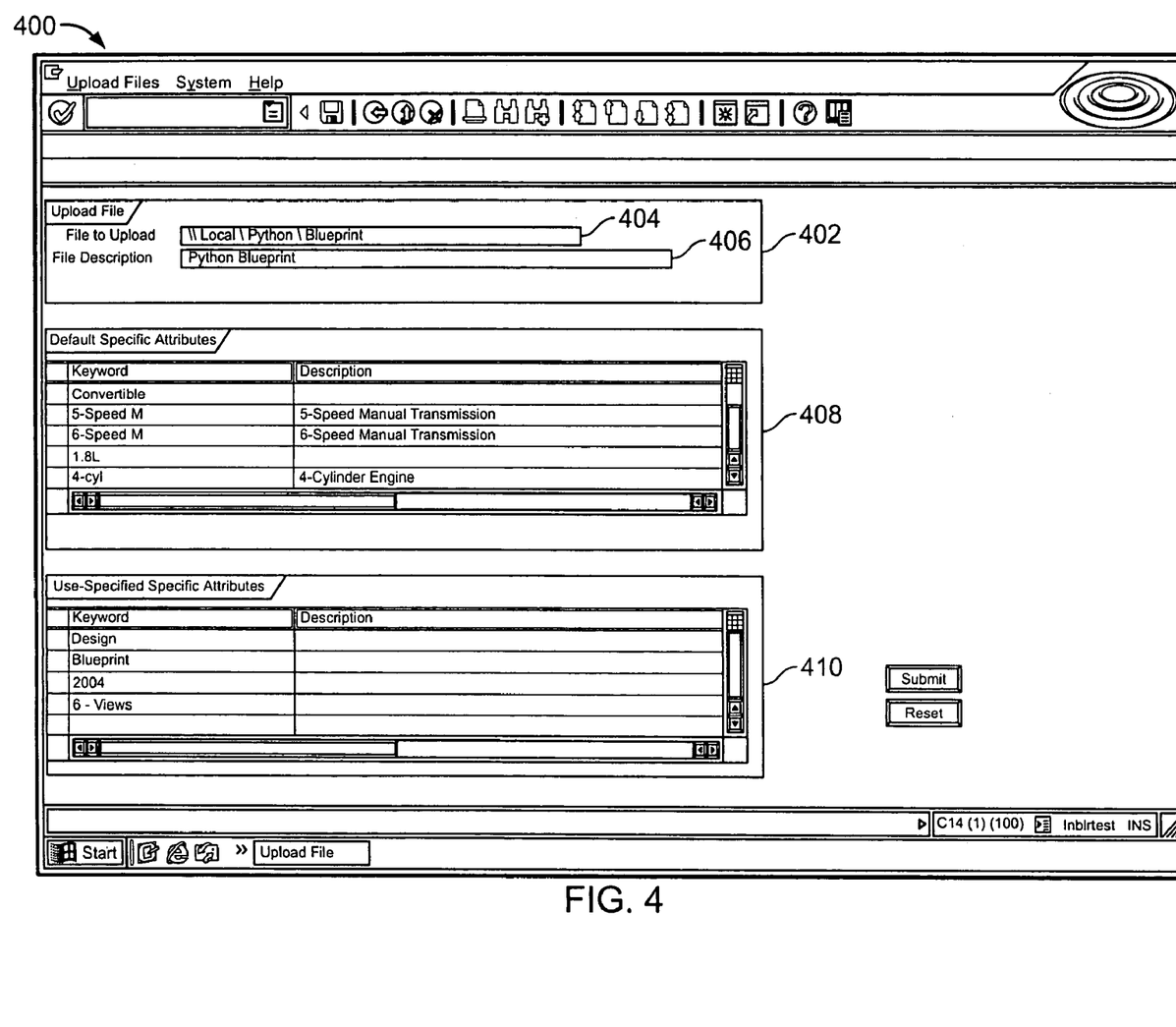

In one implementation, the repository tool 126 displays the upload file interface 400 of FIG. 4 in response to the user selection of the "Python" generic attribute ID. The user 140 enters information in various input fields of an "Upload File" panel 402 to identify the knowledge resource file to be uploaded to the knowledge repository 170. For example, the user 140 can enter a file location defined by a pathname "\\local\python\blueprint" specifying a node (file or directory) of a storage device associated with the user's client computer 102 in the input field labeled "File to upload" 404. The user can then provide a brief description of the file to be uploaded in the input field labeled "File Description" 406.

The upload file interface 400 provides two "Specific Attributes" panels. The first panel 408 labeled "Default Specific Attributes" includes a table of cells that are automatically filled in, by the repository tool 126, with the default specific attributes associated with the Python generic attribute against which the knowledge repository file is uploaded. These default specific attributes (e.g., "convertible", "5-speed manual transmission", "6-speed manual transmission", "1.8 L", and "4-cylinder engine") are provided in the "Default Specific Attributes" panel when the upload file interface 400 is displayed to the user 140.

The second panel 410 labeled "User-Specified Specific Attributes" includes a table of cells for receiving, from the user, keyword and keyword description information used to define specific attributes that are to be associated with the knowledge resource file. Each user-specified specific attribute provides information that can be used to further identify the content of the knowledge repository file to be uploaded. In the example of FIG. 4, a user 140 who is a vehicle designer for the Python vehicle line may define user-specified specific attributes including "design", "blueprint", "2004", and "6 views" for a knowledge repository file that contains a 6-view blueprint of the 2004 Python convertible. In another example (not shown), a user 140 who is an advertising professional for the Python vehicle line may define user-specified specific attributes including "print", "winding road", "uphill" and "mountain" for a knowledge repository file that contains a page layout of a print advertisement in which a Python convertible is on an uphill, winding, mountain road.

The knowledge resource files that are uploaded to the knowledge repository 170 against, e.g., the Python generic attribute include as metadata both user-specified specific attributes and default specific attributes. The knowledge repository 170 operates as a flat file system in which knowledge resource files sharing the same enterprise context are stored in a single repository location.

The metadata that is added to each knowledge resource file as the file is uploaded against a generic attribute provides the repository tool 126 with flexibility to manage the files post-upload in response to changing enterprise needs. For example, access to the knowledge repository files is enforced on a workgroup-level (e.g., only members of a workgroup that has previously been assigned to a generic attribute can upload knowledge repository file against that generic attribute). When new employees join the enterprise, the repository administrator 142 can quickly and easily add them to various workgroups in order to obtain access to the relevant knowledge resource files.

In another example, suppose the number of knowledge resource files that have been uploaded against the Python generic attribute becomes so large as to require that the files be located on different physical machines. In such a scenario, it may be useful to separate the knowledge resource files uploaded against the Python generic attribute along business units. The repository administrator 142 uses the workgroup maintenance module 126a to create, e.g., two new workgroups, namely a "ConvProdDevTeam" workgroup and a "ConvMktgTeam". Each workgroup is assigned a subset of users from the ConvTeam workgroup. The repository administrator 142 then uses the generic attribute maintenance module to create two new generic attributes, one having a generic attribute ID of "PythonProdDev" and the other having a generic attribute ID of "PythonMktg". The ConvProdDevTeam is assigned to the PythonProdDev generic attribute and the ConvMktgTeam is assigned to the PythonMktg generic attribute.

In one implementation, a transfer file module 126d of the repository tool 126 provides a transfer files interface through which the repository administrator 142 moves knowledge repository files at the repository location associated with the Python generic attribute to repository locations associated with the PythonProdDev generic attribute and the PythonMktg generic attributes. In the example transfer files interface 500 shown in FIG. 5, the repository tool 126 provides a "Source Path" panel 502 and a "Destination Path" panel 504.

Figure 5:
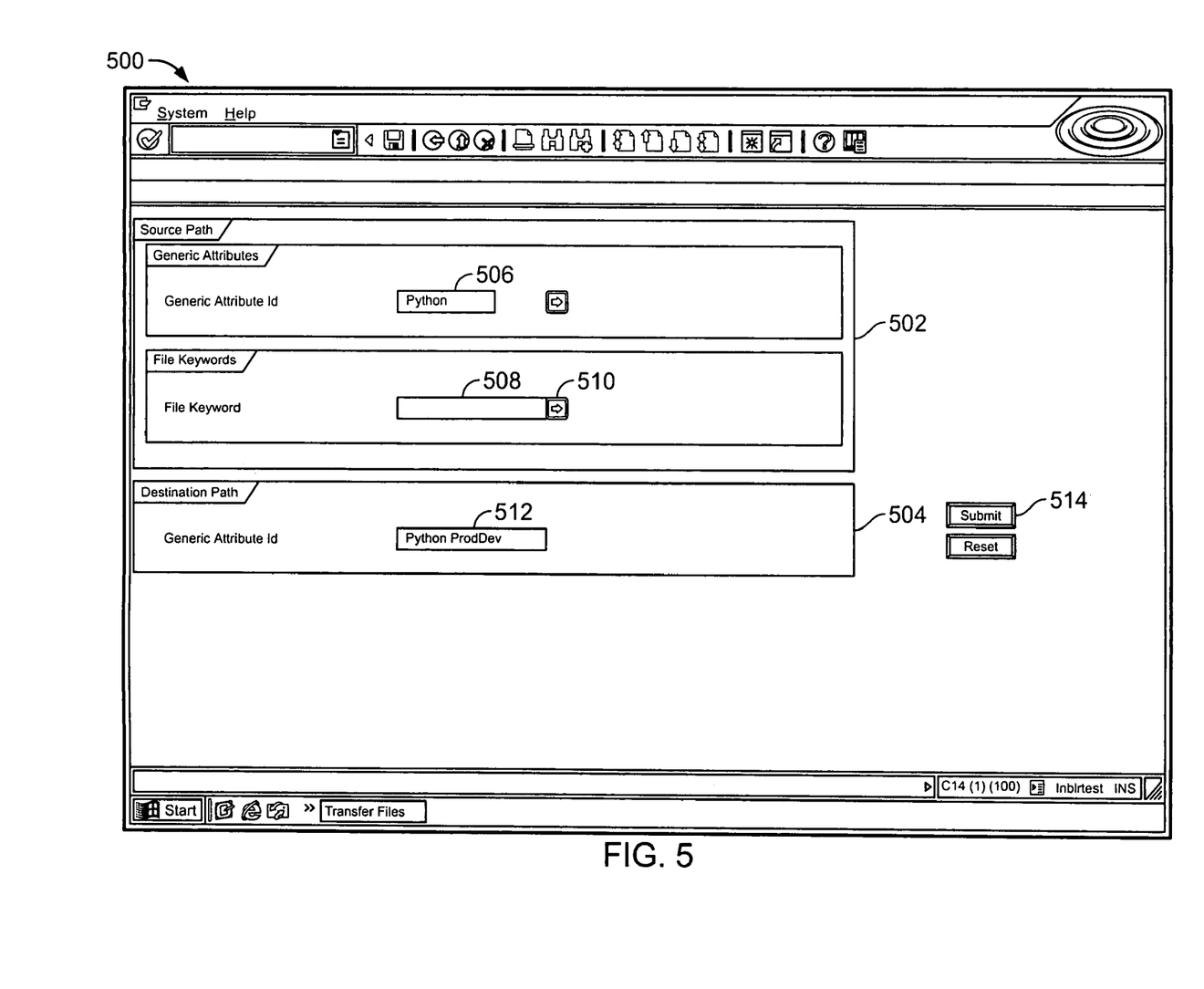

In the "Source Path" panel 502, the repository administrator 142 identifies a source generic attribute ID 506 (e.g., the Python generic attribute) and enters one or more specific attributes in the input field labeled "File Keyword" 508. The repository administrator 142 enters those user-specified specific attributes that would likely identify the subset of files in the repository location ("source repository location") associated with the source generic attribute that have content to be transferred to the repository location ("destination repository location") associated with the new generic attribute. In one implementation, the repository tool 126 compiles a list including all of the user-specified specific attributes for the knowledge repository files located at the source repository location, and displays the compiled list in the transfer files interface when the repository administrator 142 selects an arrow button 510 located to the right of the input field labeled "File Keyword" 508. The displayed compiled list may include a selectable checkbox alongside each user-specified specific attribute. In another implementation, the displayed compiled list provides one or more fields in which the repository administrator 142 may enter logical conditions regarding the transfer of files from the source repository location to the destination repository location. Each logical condition is formed by a logical expression of user-specified specific attributes that are combined using logical operators (e.g., AND, OR, and NOT). One example logical expression is "A1 AND A2 OR A3 AND A4 NOT A5", where A1, A2, A3, A4, and A5 are user-specified specific attributes.

In the "Destination Path" panel 504, the repository administrator 142 identifies a destination generic attribute ID 512 (e.g., the PythonProdDev generic attribute or the PythonMktg generic attribute). When the repository administrator 142 clicks on the "Submit" button 514 displayed in the transfer files interface 500, the repository tool 126 initiates a file transfer process which involves identifying those files at the source repository location that include the user-specified specific keywords provided in the "File Keyword" input field, and moving the identified files to the destination repository location. Once the files have been moved to the destination repository location, only the members of the workgroups assigned to the generic attribute associated with the destination repository location are permitted access to those knowledge resource files.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results. For example, although the knowledge repository is represented in FIG. 1 by a single database 170, the knowledge repository may be implemented by a distributed database physically located on a number of networked remote computers (not shown) in one or more locations. In such a case, each remote computer has an area of its respective hard disk space that is devoted to implementing a portion of the knowledge repository, and the distributed database exhibits, e.g., location transparency, fragmentation transparency, and replication transparency.

What is claimed is:

1. A computer implemented method comprising:
receiving input specifying a file to be uploaded to a file repository against a generic attribute, the generic attribute being associated with a location in the file repository, wherein the generic attribute is associated with a user access list comprising one or more user identifiers corresponding to one or more users authorized to upload a file against the generic attribute, and wherein the generic attribute defining a link between a workgroup, a location in the file repository, and an enterprise context;
receiving input, from an authorized user, specifying one or more default specific attributes, and a logical expression comprising user-specified specific attributes;
adding metadata to the specified file, the added metadata comprising the one or more default specific attributes; and
storing the specified file with the added metadata at the location in the file repository associated with the generic attribute;
receiving input, from an authorized user, defining a new generic attribute, the new generic attribute being associated with a location in the file repository and the one or more default specific attributes;
performing a search of the file repository to identify files with the added metadata including the one or more default specific attributes associated with the new generic attribute;
moving the identified files to the location in the file repository associated with the new generic attribute;
redefining the generic attribute such that the generic attribute is associated with a new location in the file repository; and
moving one or more files that were previously uploaded to the file repository against the generic attribute to the new location in the file repository.

2. The method of claim 1, further comprising:
receiving input, from the user, specifying one or more specific attributes to be associated with the specified file.

3. The method of claim 1, wherein the added metadata further comprises one or more user-specified specific attributes.

4. The method of claim 1, wherein the file repository is associated with an enterprise, and the generic attribute is associated with an enterprise context formed by a logical grouping of knowledge for the enterprise.

5. The method of claim 1, wherein the file comprises text, images, executables, or binary data.

6. A computer program product, tangibly embodied in a machine-readable storage device, the computer program product being operable to cause a machine to:
receive input specifying a file to be uploaded to a file repository against a generic attribute, the generic attribute being associated with a location in the file repository, wherein the generic attribute is associated with a user access list comprising one or more user identifiers corresponding to one or more users authorized to upload a file against the generic attribute, and wherein the generic attribute defining a link between a workgroup, a location in the file repository, and an enterprise context;
receive input, from an authorized user, specifying one or more default specific attributes and defining a logical expression comprising user-specified specific attributes;
add metadata to the specified file, the added metadata comprising the one or more default specific attributes;
store the specified file with the added metadata at the location in the file repository associated with the generic attribute;
receive input, from an authorized user, defining a new generic attribute, the new generic attribute being associated with a location in the file repository and the one or more default specific attributes;
perform a search of the file repository to identify files with the added metadata including the one or more default specific attributes associated with the new generic attribute;

move the identified files to the location in the file repository associated with the new generic attribute;

redefine the generic attribute such that the generic attribute is associated with a new location in the file repository; and move one or more files that were previously uploaded to the file repository against the generic attribute to the new location in the file repository.

7. The computer program product of claim 6 being further operable to cause the machine to:

receive input, from the user, specifying one or more specific attributes to be associated with the specified file.

8. The computer program product of claim 6, wherein the added metadata further comprises one or more user-specified specific attributes.

9. The computer program product of claim 6, wherein the file repository is associated with an enterprise, and the generic attribute is associated with an enterprise context formed by a logical grouping of knowledge for the enterprise.

10. The computer program product of claim 6, wherein the file comprises text, images, executables, or binary data.

\* \* \* \* \*